United States Patent [19]

Gaynor

[11] Patent Number: 5,229,832
[45] Date of Patent: Jul. 20, 1993

[54] OPTICAL ULTRASONIC MATERIAL CHARACTERIZATION APPARATUS AND METHOD

[75] Inventor: Edwin S. Gaynor, Gaithersburg, Md.

[73] Assignee: Industrial Quality, Inc., Gaithersburg, Md.

[21] Appl. No.: 726,584

[22] Filed: Jul. 8, 1991

[51] Int. Cl.$^5$ .............................. G01B 11/16
[52] U.S. Cl. ......................... 356/360; 356/358; 356/352; 73/655; 73/657
[58] Field of Search ............. 356/360, 358, 352, 355, 356/357; 73/657, 655

[56] References Cited

U.S. PATENT DOCUMENTS

| | | | |
|---|---|---|---|
| 4,928,527 | 5/1990 | Burger et al. | 356/358 |
| 4,966,459 | 10/1990 | Monchalin | 356/358 |
| 5,080,491 | 1/1992 | Monchalin et al. | 356/352 |

OTHER PUBLICATIONS

J. P. Monchalin, "Optical Detection of Ultrasound," 1986, pp. 485-499, IEEE Transactions on Ultrasonics, Ferroelectrics, and Frequency Control, UFFC-33.
J. P. Monchalin, "Measurement of In-plane and Out-of-Plane Ultrasonic Displacements by Optical Heterodyne Interferometry," 1989, pp. 1-28, Journal of Nondestructive Evaluation, Special Issue on Optical Methods.
M. Paul, B. Betz and W. Arnold, "Interferometric Detection of Ultrasound at Rough Surfaces Using Optical Phase Conjugation," 1987, pp. 1569-1571, Applied Physics Letters.
J. W. Wagner and J. B. Spicer, "Theoretical Noise-limited Sensitivity of Classical Interferometry," 1987, pp. 1316-1326, Journal of the Optical Society of America B, vol. 4.
A. Kersey, F. Buchholtz and A. Dandridge, "New Nonlinear Phase Transduction Method for DC Measurand Interferometric Fibre Sensors," 1986, pp. 75-76, Electronics Letters, vol. 22.
C. D. Butter and G. B. Hocker, "Fiber Optics Strain Gauge," 1978, pp. 2867-2969, Applied Optics, vol. 17.
Y. Hirose and Y. Tsuzuki, "Measurement Method of VHF Elastic Vibrations by Optical Fiber Interferometric Sensing," 1989, pp. 360, 362, 364, 43rd Annual IEEE Symposium on Frequency Control.
Ultra Optec, Inc.'s Instructions Manual OP-35-I/O, "Optical Probe for Ultrasound Detection".
J. Feinberg, "Optical Phase Conjugation in Photorefractive Materials," 1983, pp. 417-443, Chapter 11, Academic Press.
A. D. W. McKie and J. W. Wagner, "Optical Sensing of In-Plane Ultrasonic Transients," 1988, pp. 1043-1044, Applied Physics Letters, vol. 53.
T. D. Dudderar, C. P. Burger, J. A. Gilbert, J. A. Smith and B. R. Peters, "Fiber Optic Sensing for Ultrasonic NDE," 1987, pp. 135-146, Journal of Nondestructive Evaluation, vol. 6.

Primary Examiner—Samuel A. Turner
Assistant Examiner—La Charles Keesee
Attorney, Agent, or Firm—Kirkland & Ellis

[57] ABSTRACT

A dual-interferometer apparatus for simultaneously measuring in-plane and out-of-plane ultrasonic displacements of the surface of materials comprising a single laser source, optical fibers, optical couplers and dividers, a phase-conjugate mirror, and a path length stabilizing system including a piezoelectric compensator. The present invention is unique in providing for the automatic alignment of the beams of the two interferometers, thus eliminating the need for time-consuming alignment procedures. The automatic alignment of the interferometers is achieved because a phase conjugate mirror is used to generate a counterpropagating beam used by both interferometers, and because the beams for the out-of-plane interferometer are derived from the beams used for the in-plane interferometer.

39 Claims, 5 Drawing Sheets

OPTICAL ULTRASONIC MATERIAL CHARACTERIZATION APPARATUS AND METHOD

BACKGROUND

Field of the Invention

The present invention relates to an apparatus and method for optical interferometric measurements of in-plane and out-of-plane ultrasonic surface displacements in materials. The apparatus of the present invention provides for automatic alignment of the interferometric system and for simultaneous measurements of in-plane and out-of-plane displacements. These features eliminate time-consuming alignment procedures required by conventional apparatus. The attenuation of the displacements can be obtained directly, because the in-plane and out-of-plane components of the displacement amplitude are separately measured.

BACKGROUND OF THE INVENTION

The measurement of surface displacements resulting from the propagation of ultrasonic waves in a material is a powerful technique for characterizing the elastic and anelastic properties of materials. When the material is elastically isotropic and homogeneous, measurements of the velocity and attenuation of the longitudinal and shear ultrasonic vibrational waves can be used to determine the bulk elastic properties of the material, i.e., Young's modulus and the shear modulus. The velocity and attenuation of longitudinal waves can be determined from measurements of out-of-plane surface displacements. The velocity and attenuation of shear waves can be determined from measurements of in-plane surface displacements. Similar measurements can be made in non-isotropic media, in which case the analysis of the data must be carried out with the appropriate boundary conditions accounting for the non-isotropic media.

Optical interferometric methods for detecting surface displacements allow the detection of ultrasonic displacements without contacting the surface. Non-contact measurements of the surface displacement are essential when the sample is small or fragile; or when the measurements must be done at high temperatures; or when any physical contact with the sample would introduce additional errors to the measurement. Furthermore, non-contact optical measurements are generally non-destructive. These techniques could be adapted to mapping the surface, i.e., scanning the detection beams across the surface and, thus, obtaining Young's modulus and the shear modulus of the material as a function of position on the surface.

Such a scanning system can be supplemented by laser ultrasound-generating equipment. This equipment yields an ultrasonic impulse originating at the point of illumination. The scanning detection and scanning ultrasound-generating systems can then be used together to characterize the material for its defects as well as for its bulk properties.

Optical interferometric detection of ultrasonic vibrational waves is based upon the detection of changes in a spatial interference pattern. The spatial interference pattern established in the absence of vibrational waves in the sample is disturbed by the arrival of vibrational waves. The vibrational waves introduce an additional phase proportional to the time-dependent wave-induced surface displacement vector D(t).

Several dual-purpose optical interferometric instruments have been reported. J. P. Monchalin reviews interferometric techniques, including homodyne interferometers, heterodyne interferometers, and differential speckle interferometers, for detecting ultrasonic waves in "Optical Detection of Ultrasound," published in the *IEEE Transactions on Ultrasonics, Ferroelectrics, and Frequency Control*, UFFC-33, p. 485 (1986). Y. Hirose and Y. Tsuzuki describe a measurement method based upon the homodyne detection and processing of the relative phase modulation, due to surface vibrations, between two interfering light beams in "Measurement Method of VHF Elastic Vibrations by Optical Fiber Interferometric Sensing," published in the 43rd *Annual IEEE Symposium on Frequency Control*, p. 360, Denver, Colo. (May, 1989). J. P. Monchalin et al. describe a heterodyne interferometric technique in "Measurement of In-Plane and Out-Of-Plane Displacements by Optical Heterodyne Interferometry," *Journal of Non-Destructive Evaluation, Special Issue on Optical Methods* (Plenum Publishing, 1989). The instruments described in these articles all require precise, time-consuming instrument alignment because, unlike the apparatus of the present invention, they are not self-referencing relative to the orientation of the sample surface.

M. Paul et al. in "Interferometric Detection of Ultrasound at Rough Surfaces Using Optical Phase Conjugation," *Applied Physics Letters*, 50, 1569–71 (1987) describe a heterodyne interferometric technique that uses a phase conjugate mirror to generate a phase-conjugated replica of a beam reflected from the rough surface of an aluminum block. The replica beam propagates back to the same spot on the aluminum block from which the incident beam was reflected. This beam retraces the path of the incident beam in reverse, then combines with a frequency-shifted reference beam to provide the detector signal.

The present invention utilizes a phase conjugate mirror to generate a counterpropagating replica of an input beam. The phase conjugate mirror is used for its unique capacity to reverse an incident beam in phase as well as in direction. Phase conjugate mirrors use photorefractive materials such as $BaTiO_3$. Other effective photorefractive materials include $Bi_{12}SiO_{20}$ and $KTa_{1-x}Nb_xO_3$, where $0 \leq x \leq 1$. The theory and application of optical phase conjugation in photorefractive materials is described by Jack Feinberg in *Optical Phase Conjugation*, ch. 11, pp. 417–443 (Academic Press, 1983), which is incorporated by reference herein, and on which the following paragraph is based.

Two uniform coherent optical beams with non-orthogonal polarizations intersecting in a crystal create a spatially periodic intensity pattern. If the crystal initially contains a uniform density of trapped impurities of a given type (e.g., donor impurities), then the non-uniform light pattern generates equal densities of mobile and immobile charges of opposite sign. The mobile charges migrate away from the high-intensity regions to the low-intensity regions and are trapped again by impurities, resulting in a semi-permanent spatially periodic charge distribution, thus producing a spatially periodic electrostatic field. This electrostatic field then produces a spatially periodic variation in the index of refraction of the crystal, thus, forming a diffraction grating in the crystal. The spacing of the diffraction grating is dictated by the wavelength of the beams, and by the angle of their intersection. The planes of the diffraction grating bisect the first and second beams. A third beam incident on this diffraction grating scatters at the Bragg angle off the grating, thus producing a fourth beam. If the second and third beams are exactly counterpropagating, the fourth beam diffracts in the opposite direction to the first beam, and the fourth beam is phase conjugated with respect to the first beam. The device thus performs as a phase conjugate mirror (PCM), with the first beam as the incident beam, and the fourth beam as the reflected beam. Thus, the second beam functions as the "pumping beam," and the third beam is the "readout beam." The relative magnitude of the scattering of the third beam depends upon the orientation of the crystallographic axes of symmetry with respect to the beams, and upon the relative intensities of the first and second beams. Generally, the most efficient scattering occurs when the first and second beams have equal intensities.

SUMMARY OF THE INVENTION

The present invention is a dual interferometric optical system for simultaneously measuring both in-plane and out-of-plane ultrasonic surface displacements in materials. In-plane displacements of a surface are displacements of elements within the surface in a direction parallel to the surface. See Krautkrämer, J. and Krautkrämer, H. *Ultrasonic Testing of Materials*. Springer-Verlag, N.Y., (1983), pp. 5–12. Out-of-plane displacements of a surface are displacements of elements within the surface in a direction normal to the surface. The movement of surface elements relative to each other varies the surface density or acoustic pressure of the material. This pressure characterizes the ultrasonic wave. The principles of the present invention will be explained in this section with reference to FIG. 1. A detailed description of FIG. 1 is set forth in the "Detailed Description of the Invention" section below.

Figure 1:
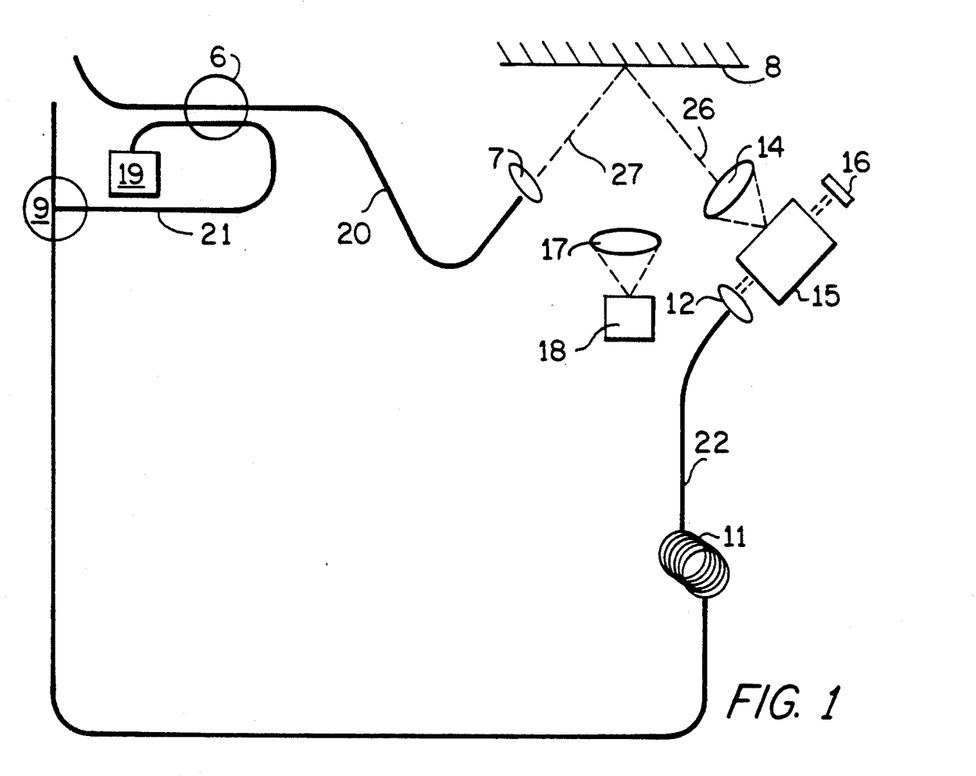
FIG. 1 is a schematic diagram of the basic apparatus of the present invention.

Note that an in-plane displacement of the surface elements in surface 8 to the right in FIG. 1 (i.e., a sideways movement to the right of surface 8) reduces optical path length 26 and increases optical path length 27. For the small ultrasonic displacement of concern, it has no significant effect on the sum of optical path lengths 26 and 27. An out-of-plane displacement of surface 8 (i.e., a movement of surface 8 towards detector 18) reduces the sum of optical path lengths 26 and 27, but has no effect on the relative length of optical path lengths 26 and 27 (i.e., it reduces both path lengths equally). Thus in-plane displacements of the surface can be detected by monitoring the relative lengths of optical paths 26 and 27, whereas out-of-plane displacements can be detected by monitoring the sum of optical path lengths 26 and 27.

The in-plane signal is monitored at detector 18, and the out-of-plane signal is monitored at detector 19. At each detector, an interference pattern is produced by the interference of two beams. When the relative path lengths of the two beams changes, the interference pattern changes.

The interference pattern at in-plane detector 18 is created by the interference of a first beam derived directly from a laser (a beam traveling along optical path 27 in FIG. 1), and a counterpropagating beam produced by the phase conjugate mirror from the first beam after the first beam is reflected by the surface of the material (the counterpropagating beam travels along optical path 26 in FIG. 1). The counterpropagating beam is incident upon the sample surface at the exact location that the first beam is incident upon the sample surface. The in-plane signal is obtained from the interference pattern of these two beams, as the light forming the interference pattern is scattered by the sample surface onto in-plane detector 18. In-plane (sideways) movements of surface 8 affect the relative lengths of optical paths 26 and 27, as explained above, and therefore cause changes in the pattern created by the interference of the two beams.

A second interference pattern is created at out-of-plane detector 19 by the interference between a reference beam derived from the laser (directed at detector 19 by optical fiber 21), and the counterpropagating beam after it is reflected by the sample surface. In this case, the path length of the counterpropagating beam includes both optical paths 26 and 27, whereas the reference beam never interacts with surface 8, and therefore is never affected by surface displacements. Therefore, out-of-plane displacements of surface 8 directly affect the path length of the counterpropagating beam, without affecting the path length of the reference beam. The counterpropagating beam is combined in coupler 6 with the reference beam from optical fiber 21 and directed at detector 19. Thus a movement of surface 8 towards detector 18 would reduce the total path of the counterpropagating beam from lens 14 to lens 7 (i.e., it would reduce the sum of optical paths 26 and 27), but would have no effect on the reference beam. Therefore, a movement of surface 8 towards detector 18 produces a change in the pattern created by the interference of the counterpropagating beam (as it is collected by lens 7, and directed at detector 19 by optical fiber 20 and coupler 6) and the reference beam (directed at detector 19 by optical fiber 21 and coupler 6). Because the out-of-plane interference pattern is created by the same counterpropagating beam that created the in-plane interference pattern, the out-of-plane detector records the out-of-plane surface displacements at exactly the same location as does the in-plane detector.

The use of a phase conjugate mirror that generates a counterpropagating replica of a laser beam incident upon a surface thus guarantees the automatic alignment of the interferometers, i.e., the counterpropagating replica is always incident upon the sample surface at the same location and angle as the initial laser beam, just because it is a counterpropagating replica of that beam.

The most important advantages of the present invention are that the apparatus does not require precise alignment, and that simultaneous measurements can be obtained of the in-plane and out-of-plane displacements. The instrument can be misaligned by as much as ±10° relative to the sample surface with only a minor effect on the relative signal amplitude ($\leq 15\%$), and no effect on the relative arrival times of the longitudinal and shear waves. The longitudinal and shear measurements are obtained simultaneously at separate detectors. The signals are combined to yield the relative contributions of the vibrational wave modes. Because both signals are obtained simultaneously and are similarly affected by characteristics of the sample surface, they are self-normalizing in real time and can be analyzed by their relative strengths as well as by their arrival times.

It is an object of the present invention to provide an apparatus and method for the non-contact simultaneous measurement of longitudinal and shear vibrational waves in solids with a single optical interferometric instrument that does not require precise alignment. The tolerance of the apparatus to misalignment greatly reduces the measurement time, and increases the ease with which the measurements can be made.

DETAILED DESCRIPTION OF THE INVENTION

Figure 2:
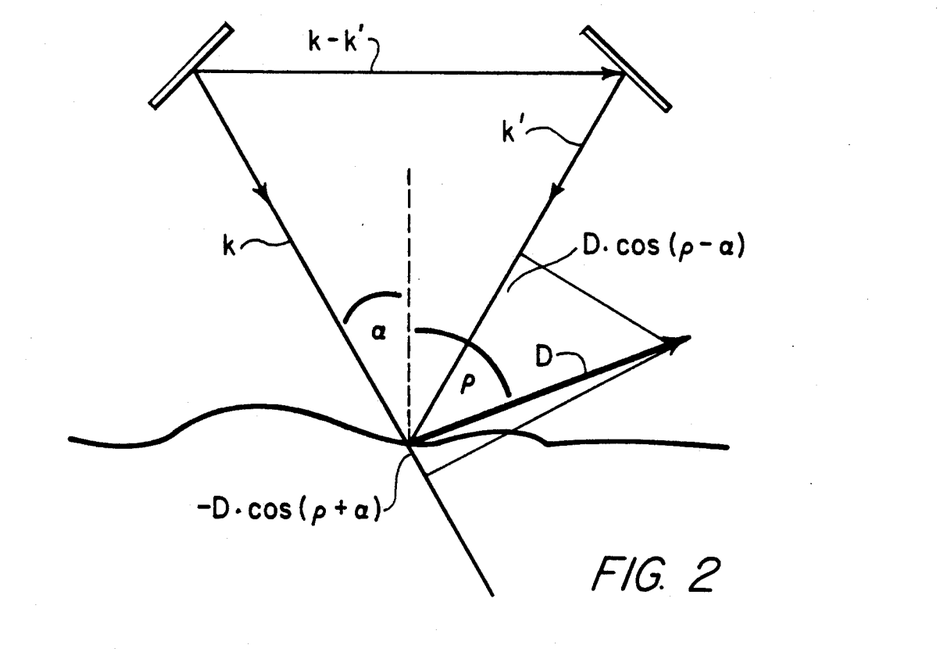
FIG. 2 shows the geometry of in-plane and out-of-plane displacements.
Figure 3:
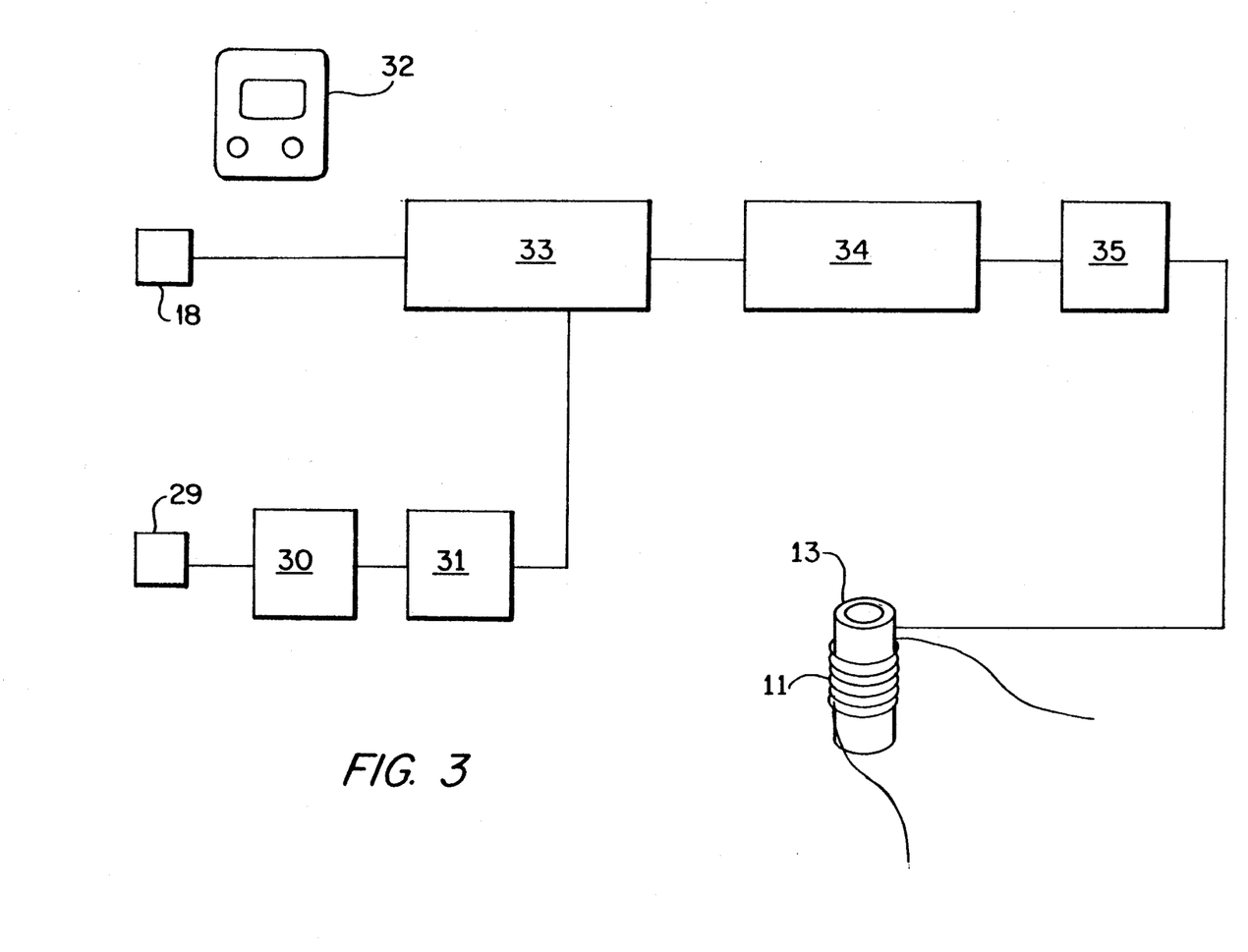
FIG. 3 is a block diagram of an electromechanical system for stabilizing the optical path lengths in the interferometers.
Figure 4:
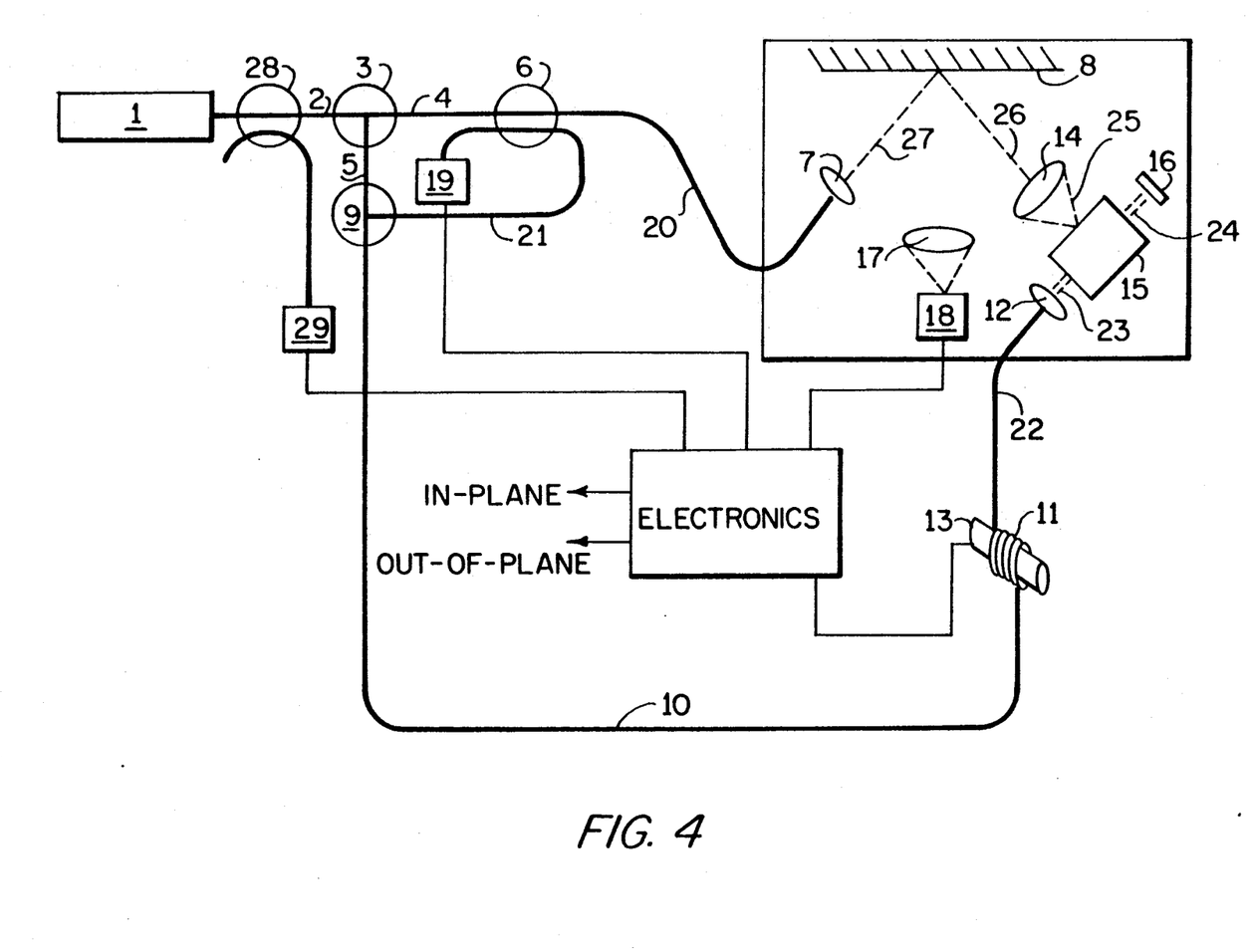
FIG. 4 is a schematic block diagram of a first preferred embodiment of the present invention.
Figure 5:
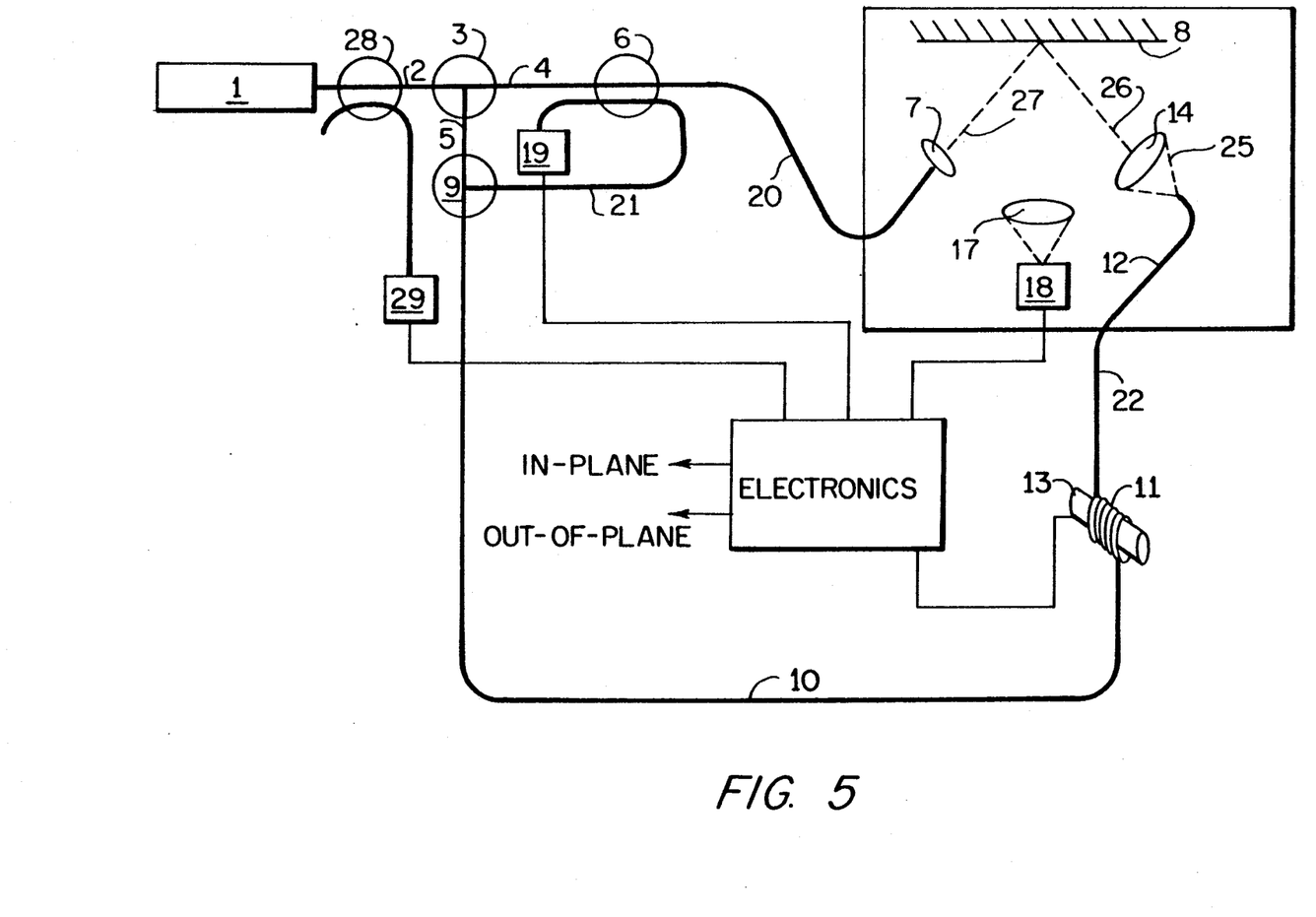
FIG. 5 is a schematic block diagram of a second preferred embodiment of the present invention.
Figure 6:
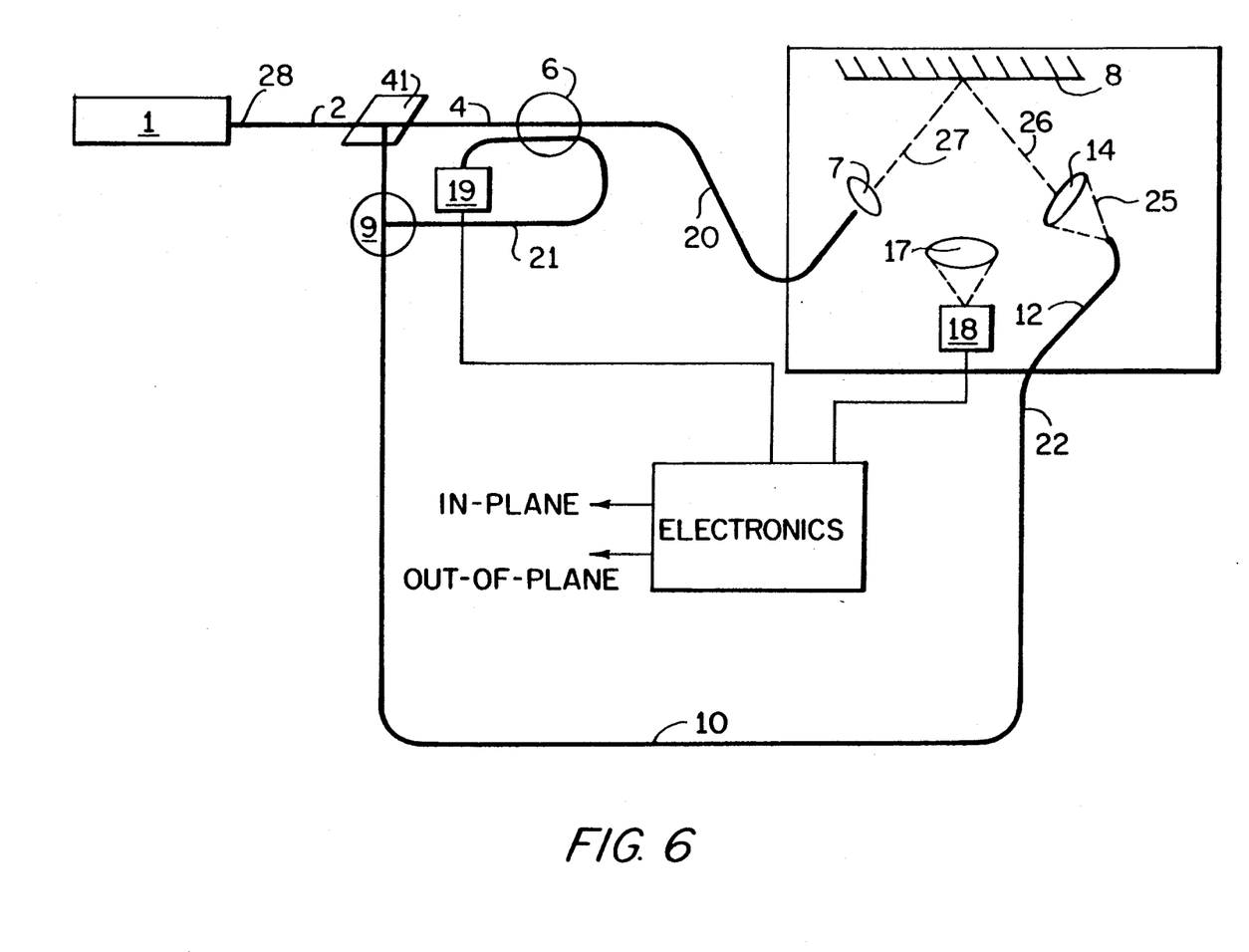
FIG. 6 is a schematic diagram of a third preferred embodiment of the present invention.

The present invention is a dual interferometer system for measuring both in-plane and out-of-plane displacements of surfaces. The detailed description of invention herein consists of three subsections. The first subsection is a derivation of the signals obtained at the detector for the in-plane interferometer and at the detector for the out-of-plane interferometers. The derivation will be described with reference to a schematic diagram of the basic apparatus, shown in FIG. 1, and a diagram of the geometry of the surface displacements, shown in FIG. 2. The second subsection discusses the requirements for path compensation and stabilization. A schematic diagram of the path compensation and stabilization apparatus is shown in FIG. 3. The third subsection is a detailed description of three preferred embodiments of the present invention, and of the electro-mechanical path stabilization system required for the first two preferred embodiments. Detailed block diagrams of preferred embodiments of the invention are shown in FIGS. 4, 5 and 6.

DERIVATION OF THE DETECTOR SIGNALS

The derivation of the detector signals in this subsection applies generally to the first two preferred embodiments of the present invention.

In-Plane Signal: Radiation derived from a laser is split into two beams. The first beam is directed by an optical fiber and lens towards the rough surface of a sample. It is diffusely reflected by the sample surface and enters a phase conjugate mirror (PCM). The second beam is also directed at the PCM, by another optical fiber and lens. FIG. 1 shows the first beam, directed by optical fiber 20 and lens 7 at surface 8, and the second beam, directed at PCM 15 by optical fiber 22 and lens 12. A portion of the second beam is transmitted through PCM 15, then is reflected back by external mirror 16 into PCM 15, thus providing a third beam which is directly opposite to the second beam. The three beams combine in PCM 15, as described above, producing a fourth beam which is an exact counterpropagating replica of the first beam. Because the fourth beam is a counter-propagating replica of the first beam, it hits the sample surface 8 at the exact spot from which the first beam was reflected and at the same angle relative to the surface normal as the incident angle of the first beam. A portion of the fourth beam is scattered by the rough surface of the sample, and a portion of the fourth beam is reflected by the surface. The scattered portion, after interference with the first beam at the sample surface, is collected by lens 17 and focussed onto in-plane detector 18. The reflected portion is used to produce the out-of-plane signal, as discussed below. Thus the interference pattern of the first and fourth beams, as scattered by the rough surface, is imaged onto the in-plane detector to produce the in-plane signal.

Before the arrival of the vibrational waves, the intensity detected at the in-plane detector is given by:

$$I_i(t) = B_i + A_i \cos\{\phi(x)\}$$

where $I_i$ is the in-plane intensity, t is time, x is a surface coordinate directed along the surface in the plane formed by the two beams striking the surface, $\phi(x)$ is the phase difference between the two beams, $B_i = A_{i1}^2 + A_{i2}^2$, and $A_i = 2 A_{i1} A_{i2}$, Where $A_{i1}$ and $A_{i2}$ are the amplitudes of the two beams at the sample surface, respectively.

After the arrival of vibrational waves, the intensity is given by:

$$I_i(t) = B_i + A_i \cos\{\phi(x) + \kappa - \kappa') \cdot D(t)\} \quad (1)$$

where $\kappa$ and $\kappa'$ are the propagation vectors of the two beams ($|\ | = k = 2\pi/\lambda$, where $\lambda$ is the optical wavelength), and $D(t)$ is the displacement vector. The geometry is shown in FIG. 2. In FIG. 2, $\kappa$ and $\kappa'$ are the optical propagation vectors, $D$ is the ultrasonically-generated surface displacement, $\alpha$ is the angle of incidence of the first beam relative to the local surface normal, and $\rho$ is the displacement direction relative to the local surface normal. The vector $\kappa - \kappa'$ is directed parallel to the surface, and its magnitude is $2k \cdot \sin(\alpha)$. Therefore the in-plane phase perturbation $S_{in}$ is given by:

$$S_{in} = (\kappa - \kappa') \cdot D(t) = 2k \cdot D \cdot \sin(\alpha) \cdot \sin(\rho), \quad (2)$$

where $D = |D|$.

Out-of-Plane Signal: The portion of the fourth beam that is reflected by the surface is combined with a beam derived from the laser source to produce the out-of-plane signal. As shown in FIG. 1, the fourth beam, after reflection by the sample surface, enters optical fiber 20. To create the out-of-plane interference pattern, a reference beam is added to the fourth beam in optical fiber 20 via directional additive fiber coupler 6, as shown in FIG. 1. Note that the first beam is travelling in the opposite direction to these beams. The reference beam is obtained at beam splitter 9 by splitting a component from the second beam before it enters path stabilization coils 11. Stabilization coils 1 1 are described in the following subsection. The interference pattern produced by the combination of the fourth and reference beams is directed to out-of-plane detector 19. Since the first beam travels in the direction opposite to the direction of the fourth beam, the first beam does not enter the directional coupler in which the other two beams combine to produce the out-of-plane interference signal.

Before the arrival of the vibrational waves, the intensity detected by the out-of-plane detector is given by:

$$I_o(t) = B_o + A_o \cos\{\phi(z)\}$$

where $I_o$ is the out-of-plane intensity, t is time, z is the coordinate directed perpendicular to the surface in the plane formed by the two beams striking the surface, φ(z) is the phase difference between the two beams, $B_o = A_{o1}^2 + A_{o2}^2$, $A_o = 2A_{o1}A_{o2}$, and $A_{o1}$ and $A_{o2}$ are the amplitudes of the two beams incident on the out-of-plane detector, respectively.

After the arrival of vibrational waves, the intensity is given by:

$$I_o(t) = B_o + A_o \cos\{\phi(z) + \kappa - \kappa') \cdot D(t)\} \quad (3)$$

where the vector $(\kappa + \kappa')$ is directed perpendicular to the surface and its magnitude is $2k \cdot \cos(\alpha)$.

Therefore, the out-of-plane phase perturbation is given by (see FIG. 2):

$$S_{out} = (\kappa - \kappa') \cdot D(t) = 2k \cdot D \cdot \cos(\alpha) \cdot \cos(\rho) \quad (4)$$

D and ρ are obtained using a value for α determined by the geometry of the apparatus. This value is an approximation. However, deviations around α greater than about 10 degrees are not possible, due to the limited aperture of the lens (lens 14 in FIG. 1. The error introduced by approximating α can be estimated using a Taylor expansion:

$$\cos(\alpha + \delta\alpha) = \cos(\alpha) - \sin(\alpha)\delta\alpha \quad (5)$$

and $$\sin(\alpha + \delta\alpha) = \sin(\alpha) + \cos(\alpha)\delta\alpha, \quad (6)$$

where δα refers to a change in α. For α=40 degrees, and δα=10 degrees, for example, the error in Equation 2 is 0.11, and in Equation 4 is 0.13. These errors are the price of the self-alignment property of this interferometer: the exact surface normal never needs to be determined for alignment, and therefore enters in as an ambiguous term in the output signal.

The in-plane component of the displacement vector D is given by (see FIG. 2):

$$D_{in} = D \cdot \sin(\rho) \quad (7)$$

and the out-of-plane displacement component is given by:

$$D_{out} = D \cdot \cos(\rho) \quad (8)$$

and therefore:

$$D_{in} = S_{in}/(2k \cdot \sin(\alpha)) \quad (9)$$

and $$D_{out} = S_{out}/(2k \cdot \cos(\alpha)) \quad (10)$$

These equations show that $D_{in}$ and $D_{out}$ can be obtained directly from $S_{in}$ and $S_{out}$.

D and ρ can be calculated as follows. ρ can be obtained from:

$$\tan(\rho) = S_{in} \cdot \tan(\alpha)/S_{out} \quad (11)$$

Then D can be calculated from ρ using either of Equations 2 or 4.

PATH COMPENSATION AND STABILIZATION

The total path length for each beam arriving at a given detector must be equal, within the coherence length of the laser, in order to maintain the relative coherency of the beams. The coherence length is dependent upon the spectral linewidth of the laser transition as follows:

$$L = c/(\delta \nu) \quad (12)$$

where L is the coherence length, c is the speed of light, and δν is the spectral linewidth. For example, if a HeNe laser is used with a typical linewidth $\delta\nu \approx 1200$ Mhz, the coherence length L is about 25 cm. As long as the fiber lengths are such that the light paths differ by less than this distance at the point of interference, the visibility of the interference pattern will be optimized.

Other factors may limit the interference pattern's visibility. The most critical of these factors is the relative intensities of the beams at the points of interference. Optimum visibility occurs for equally bright beams. Unequal brightness in the two beams can be compensated for by choosing the coupling ratios of the directional couplers which split and recombine the light paths shown in FIG. 1. Couplers can be readily obtained with any ratio between 95:5 and 50:50.

Ambient vibrations introduce phase differences in each beam as it travels in its optical fiber. The relative optical paths of the different beams must be stabilized to compensate for the effect of these ambient vibrations. To obtain path stabilization in the presence of ambient vibrations, the optical phase changes in the interference patterns must be nullified. These changes are caused by differences between the ambient effects upon the two beams making up the interference pattern. There are two effects on the uncompensated signal. The first effect is that ambient vibrations simply add noise to the detected signals, because of the relative phase changes caused by the ambient vibrations. This effect can be easily filtered out of the output signal electronically. The second effect is a decrease in the sensitivity of the interferometer. A compensating electromechanical circuit is used to compensate for this effect.

The expressions given above for $I_1$ and $I_o$ show that their spatial variation is sinusoidal. The intensity of the light in the interference pattern changes most rapidly along the direction perpendicular to the light and dark bars of the interference pattern. Moreover, the intensity pattern changes faster or slower in this direction depending upon the phase relation within any one period. At the intensity peaks the pattern changes slowly, while halfway between the peaks, the change is linear with distance. The arrival of the ultrasonic signal perturbs the sample surface so that one beam is lengthened relative to the other. The resulting phase change in the interference pattern shifts the entire interference pattern perpendicular to the bars of the interference pattern. There is very little brightness difference caused by the perturbation at the peaks. The brightness change is greatest halfway between adjoining peaks.

The in-plane signal can be used to stabilize the entire system because the fibers subject to ambient forces are shared by both the in-plane and out-of-plane systems.

Path stabilization is accomplished by wrapping a portion of the optical fiber around a piezoelectric phase modulator, i.e., path stabilization coils 11 wrapped around piezoelectric phase modulator 13, as shown in FIG. 3. The length of the optical path in path stabilization coils 11 is maintained so that the voltage output of the in-plane detector is always halfway between the maxima. Note that path stabilization coils 11 connect optical fiber 10 to optical fiber 22 (see FIG. 4). Phase-correction signals to the piezoelectric modulator are provided by the in-plane detector, as described in detail in the following paragraphs. The piezoelectric modulator stabilizes the optical path difference of the different beams by increasing or decreasing the optical path in path stabilization coils 11 to compensate for ambient vibrations.

Piezoelectric path stabilization is a common technique in fiber interferometry. The technique is described in J. W. Wagner and J. B. Spicer, "Theoretical Noise-Limited Sensitivity of Classical Interferometry," *J. Optical Society of America B*, 4, 1316 (1987), which is incorporated by reference herein. The usual method in fiber optic interferometry is to wind one leg of the fiber interferometer around a piezoelectric tube. The tube has conductors lining its inside and outside surfaces. The inside conductor is not connected electrically to the outside conductor. A constant voltage applied between these conductors will create an electric field in the piezoelectric material, which deforms the material, resulting in a change in the outside radius of the tube, which in turn results in a corresponding change in the fiber length.

The effect of stretching the fiber is to change the phase of light propagating through it. The phase changes as a result of two processes, optical path length change, and strain-induced index change. These two effects contribute approximately equally to the phase change. See A. Kersey, F. Bucholtz and A. Dandridge, "New Nonlinear Phase Transduction Method for DC Measurand Interferometric Fibre Sensors," *Electronics Letters*, 22, p. 75 (1986); and C. D. Butter and G. B. Hocker, "Fiber Optics Strain Gauge," *Applied Optics*, 17, p. 2867 (1978). The result of the theory is a simple proportionality:

$$\delta\phi/\delta l = 1.16 \times 10^7 \text{ radians/meter} \quad (13)$$

where $\delta\phi$ is the phase change, and $\delta l$ is the length change (from which a strain results). Thus the change in the radius of the piezoelectric tube which will result in a phase change of $2\pi$ radians is given by:

$$\delta r_{2\pi} = (2\pi/1.16 \times 10^7)(r/l) \text{ meters} \quad (14)$$

where r is the outside radius of the tube and l is the fiber length wound around the tube.

For example, a Vernitron PZT5H ceramic tube with a 3.6 cm outer diameter and a 0.134 cm wall thickness will exhibit a $2\pi$ phase change for 3 meters of wound fiber with less than 1 volt applied. Other equivalent ceramic piezoelectric tubes could also be used.

DETAILED DESCRIPTION OF PREFERRED EMBODIMENTS

A first preferred embodiment of the present invention is shown schematically in FIG. 4. Laser 1 emits radiation into 1×2 beam divider 28. A portion (e.g., 90%) of the laser radiation is delivered to optical fiber 2. A smaller portion (e.g., 10%) is delivered to detector 29. Optical fiber 2 is coupled via 1×2 beam divider 3 to optical fibers 4 and 5. Optical fiber 4 carries a portion of the laser radiation through a 2×2 beam divider/coupler 6 to lens 7. Lens 7 directs the beam at sample surface 8. The second portion of the laser radiation is carried by optical fiber 5 to 1×2 beam divider 9. A portion of the radiation is split off at beam divider 9 to serve as the reference beam for the out-of-plane signal. The remainder of the radiation is carried by optical fiber 10 through path stabilization coils 11 to lens 12. Path stabilization coils 11 are wrapped around piezoelectric phase modulator 13. This device serves to stabilize the optical path, as described in detail above. The beam from lens 7 reflects from sample surface 8, and is directed by lens 14 into phase conjugate mirror (PCM) 15. This beam is the first beam referred to in the description of PCMs above. The beam from lens 12 also enters the PCM as shown in FIG. 4. This is the second beam referred to in the PCM description. A portion of this beam is transmitted across the PCM, and then is reflected by mirror 16 back into the PCM. This is the third beam referred to in the PCM description. Mirror 16 is positioned so that this beam is reflected exactly opposite to the second beam. Since the second and third beams are exactly opposite to each other, the fourth beam produced by the scattering of the third beam off the diffraction grating established by the interference of the first and second beams in the photorefractive crystal propagates exactly in the opposite direction to the first beam. The fourth beam is then focused by lens 14 onto the identical spot on sample surface 8 that reflected the first beam. The interference pattern produced by the two beams is scattered by the rough surface of the sample, and imaged by lens 17 onto detector 18.

Although FIG. 4 shows the second beam (the beam directed by lens 12) incident on the PCM at right angles to the first beam (the beam directed by lens 14), the optimum angle at which the second beam enters the PCM is, in general, not at right angles to the first beam. As discussed in chapter 11 of *Optical Phase Conjugation*, referenced above, the efficiency of the PCM is dependent upon the orientation of the light-induced electric field with respect to the crystalline axes. For example, in $BaTiO_3$, the static dielectric constant $\epsilon$ is highly anisotropic, so that the amplitude of the light-induced electric field can vary by a factor of $\approx 7$ depending on its orientation with respect to the optic axis of the crystal.

The signal at detector 18 is sensitive to in-plane vibrations, because a vibration parallel to the sample surface would increase the path length for one beam, and decrease the path length for the other beam. On the other hand, out-of-plane vibrations at the surface contribute equally to both the first and fourth beams, and therefore do not alter the interference pattern between the two beams. For example, a surface vibration to the right in FIG. 4 would reduce the path length for the first beam, and increase it for the second beam. Thus, the signal at detector 18 can be used to detect in-plane surface vibrations due to ultrasonic waves.

The fourth beam is also used to detect the out-of-plane signal. The portion of the fourth beam which is reflected by the sample surface is imaged by lens 7 into the portion 20 of the optical fiber carrying the first beam. This portion of the optical fiber carries the first beam (on its way to the sample surface) and the fourth beam (after reflection from the sample surface). A reference beam obtained by splitting off a portion of the second beam at 1×2 beam divider 9 is added to the fourth beam at 2×2 beam divider/coupler 6 and directed to detector 19. The reference beam is not affected by vibrations of the sample surface. The out-of-plane signal can be derived from the sum of the two beams arriving at detector 19.

The signal at detector 19 is sensitive to the out-of-plane vibrations since a vibration out of the sample surface will change the phase of the fourth beam, but not the phase of the reference beam. For example, a vibration of the sample surface directly towards lens 17 will reduce the optical path for the fourth beam between lens 14 and lens 7, but will have no effect on the reference beam.

Fiber-optic beam-splitter 28 with a 90:10 split ratio is used to monitor the absolute light level of the laser source. The signal from detector 29 at the 10% output of the splitter is used in the path-stabilization circuit discussed below to reduce the effects of ambient noise.

Laser 1 in the preferred embodiment of the present invention is, for example, a 15 mW 632.8 nm He-Ne laser. The best results are obtained using lasers having a very small number of modes, e.g., only one or two or three modes. Laser 1 could be any He-Ne laser, Argon-ion laser, krypton-ion laser, He-Cd laser, diode laser, or other laser having sufficient power and coherence length. The phase conjugate mirror is, for example, a roughly 1 cm single crystal cube of barium titanate oriented so that the first (signal) and third (readout) beams travel at a slight angle to the perpendicular to the c-axis of the crystal. Other dimensions and materials for the phase conjugate mirror could also be used, including $Bi_{12}SiO_{20}$ and $KTa_{1-x}Nb_xO_3$, as discussed above and by J. Feinberg, in chapter 11 of *Optical Phase Conjugation* (Academic Press, 1983), and $Sr_{1-x}Ba_xNb_2O_6$ (SBN) with $0 \leq x \leq 1$ as discussed in P. Gunter and J. P. Huignard, *Photorefractive Materials and Applications II*, Springer-Verlag, Heidelberg, (1989). The optical fibers are single-mode, non-polarization-preserving optical fibers. Their core diameter is 4 μm, and their cladding diameter is 125 μm. These fibers are commercially available, e.g., from Amphenol Corp., in Lisle, Ill.

The fiber lengths are all selected to maintain maximum relative coherence between the interfering beams to maximize the visibility of the fringe patterns. The interfering beams must be within a coherence length (Equation 12) of one another at three positions: (i) at the out-of-plane detector (19) for the out-of-plane fringe pattern (this pattern extends along the length of the fiber carrying the interfering beams (fourth and reference beams)); (ii) at the specimen surface (8) for the in-plane fringe pattern; (iii) within the phase-conjugate mirror Barium Titanate crystal (15). The use of lasers with a very small number of modes best meets these conditions.

The first requirement is that the sum of optical path lengths 10, 11, 22, 23, 24×2, 25, 26, 27 and 20 equals path length 21. Thus, of the two beams that interfere at detector 19, the first must traverse the entire optical circuit from coupler 9 through the path stabilization coils, the PCM, etc., and the second must propagate an equal distance. Since optical path length 21 can be independently selected, this requirement is easily met.

The second and third requirements can be met simultaneously if the coherence length (Equation 12) is long enough. For example, a 15 mW HeNe laser with a linewidth of about 1200 MHz has a 25 cm coherence length. An argon ion laser equipped with an internal Fabry-Perot spectral filter could have a coherence length greater than 1 meter.

The second requirement is that the sum of optical path lengths 4, 20, and 27 equals the sum of optical path lengths 5, 10, 11, 22, 23, 24×2, 25 and 26. Satisfying this requirement ensures that the first beam up to the sample surface and the fourth beam travel equal path lengths.

The third requirement is that the sum of optical path lengths 4, 20, 27, 26 and 25 equals the sum of optical path lengths 5, 10, 11, 22 and 23. Satisfying this requirement ensures that the second beam and the first beam up to the PCM travel equal path lengths.

It is impossible to exactly satisfy the second and third requirements simultaneously. The best results are obtained by minimizing path lengths 24, 25 and 26. The two requirements can be met to within the sum of these three path lengths. Length 24 can be essentially zero. The sum of lengths 25 and 26 can be kept below 25 cm for many practical standoff distances. For laser sources with long coherence lengths, such as are available with a spectrally filtered laser source (either HeNe or Argon ion lasers can be spectrally filtered, but at the expense of reducing their intensity), the sum of lengths 25 and 26 can be easily reduced to below the coherence length of the laser source to obtain optimum relative coherence and simultaneous satisfaction of all three conditions.

The intensities within each pair of interfering beams should be equal to obtain maximum visibility of the interference pattern. This intensity equalization can be obtained by carefully selecting the coupling ratios of each of optical fiber couplers (3), (6) and (9). For example, assuming a sample surface reflectivity of 0.5 and a PCM coupling efficiency of 0.5, coupler 3 in FIG. 4 would be selected to transmit 35% of the incident beam to optical fiber 4 and 65% of the incident beam to optical fiber 5; coupler 6 in FIG. 4 would be selected to transmit 90% of the incident beam to optical fiber 20, and 10% of the incident beam to optical fiber 21; and coupler 9 in FIG. 4 would be selected to transmit 95% of the incident beam to optical fiber 10 and 5% of the incident beam to optical fiber 21. Optical fiber couplers may be obtained from the Amphenol Corp., Lisle, Ill. The ideal ratio for coupler 9 is even higher than 95:5, but 95:5 is the largest asymmetry commonly available.

The lenses and the ends of the optical fibers are preferably coated with an anti-reflection coating chosen to reduce extraneous reflections at the laser wavelength used. The present invention could be implemented using other means, such as mirrors or holograms, to collect the radiation from the optical fibers.

Holograms are generally produced using precisely the lens whose diffraction characteristics are to be reproduced. One or both of two interfering beams pass through the lens, and expose a photosensitive material. Holograms can be used in place of any of the lenses in FIG. 4. Holograms can also be generated by computer.

A second preferred embodiment of the present invention simplifies the instrument at the cost of increasing the sensitivity of the instrument to proper alignment, while preserving simultaneous in- and out-of-plane displacement detection. This embodiment is shown in FIG. 5. In this second preferred embodiment, components 12, 15 and 16 of the first embodiment (see FIG. 4) are removed and fiber 22 is repositioned, as shown in FIG. 5. These are the only required changes from the first preferred embodiment. An interference pattern will form on sample surface 8, just as in the first embodiment. The fourth beam now is not derived from the first beam through phase conjugation (as in the first embodiment), but interference can still be obtained with proper alignment of the optical components. The interference pattern will be perturbed by in-plane displacement components, just as in the first preferred embodiment, and the signal at detector 18 will be sensitive to in-plane displacements, as in the first preferred embodiment.

The out-of-plane signal appears at detector 19, just as in the first preferred embodiment, but without the benefit of alignment insensitivity. As in the first preferred embodiment, a reference beam derived from the laser source is used to interfere with a beam reflected from the sample surface and produce the interference pattern. The total path length for the beam reflected from the laser surface includes optical paths 10, 11, 22, 25, 26, 27 and 20. This total path is similar to the total path in the first preferred embodiment, but without paths 23 and 24.

Path compensation can be more easily achieved in the second preferred embodiment, because there are now only two interference patterns at which coherence between the interfering beams must be preserved. This allows for optimum coherence to be satisfied for the interferometer, even for short coherence length sources, since it is possible to simultaneously constrain all of the path lengths involved. Thus, for optimum contrast in the interference pattern at detector 18, the sum of path lengths 5, 10, 11, 22, 25 and 26 must equal the sum of path lengths 4, 20 and 27. For optimum contrast in the interference pattern at detector 19, the sum of path lengths 10, 11, 22, 25, 26, 27 and 20 must equal path length 21.

A third preferred embodiment of the present invention utilizes heterodyne interferometers, instead of the homodyne interferometers used in the first two embodiments. The use of heterodyne interferometers eliminates the need for the electromechanical path stabilization system. The third embodiment, like the second embodiment, does not use a phase conjugate mirror. FIG. 6 is a schematic of the dual heterodyne interferometer system of the third preferred embodiment. Acousto-optic modulator 41 (e.g., a Bragg Cell) imposes a frequency shift onto the beam in optical fiber 5. The frequency shift causes the interference patterns at detector 19 and at sample surface 8 to constantly shift at a constant rate. In-plane and out-of-plane surface displacements will cause changes in the shifting patterns. These changes will appear in the properly demodulated outputs of detectors 18 and 19. The theory of heterodyne interferometry for ultrasound detection is thoroughly discussed in "Optical Detection of Ultrasound", in the *IEEE Transaction on Ultrasonics, Ferroelectrics, and Frequency Control*, UFFC-33, pg. 485 (1986).

The third embodiment differs from the second embodiment in comprising an acousto-optic modulator, and in not requiring path compensation or stabilization. The other components of the third preferred embodiment are similar to the components of the second preferred embodiment.

THE ELECTRO-MECHANICAL PATH STABILIZATION SYSTEM

An example of an electro-mechanical system that can be used to stabilize the optical path length is shown in FIG. 3. The system uses a small bandwidth, low-frequency circuit (~0 Hz -1 Khz) to stabilize the path length, because ultrasonic transients occur at frequencies at ~1 Mhz, far above the highest frequency ambient vibrations. The highest-frequency ambient vibrations are at frequencies below ~1 Khz.

Inputs to the path-stabilization circuit include the signals from detectors 18 and 29. The signal from detector 18 is split between oscilloscope 32 and subtraction circuit 33. The signal from laser light level detector 29 is fed into offset control 30 and gain control 31. Both the offset and the gain in this path are adjustable. The signal produced by subtraction circuit 33 is the zero-biased version of the signal from detector 18, compensated for laser level fluctuations.

Low-pass filter 34 blocks frequencies above 1 Khz, passing frequencies from DC to 1 Khz. Signals produced by ambient vibrations are generally below 1 Khz, whereas the transient ultrasonic signals produced by surface vibrations occur at much higher frequencies, e.g., at 0.05–50 MHz. The circuit thus produces a signal representing ambient vibrations with zero bias that does not include a component due to surface vibrations. This signal is amplified by amplifier 35 and sent to piezoelectric modulator 13. The amplifier gain can range between 50 and 200. This gain is set by the user, once the system is aligned. Piezoelectric modulator 13 expands or contracts according to the ambient vibrations signal, increasing or decreasing the optical path length in optical fiber 11, which is wound around piezoelectric modulator 13.

The phase of the light exiting optical fiber 11 is thus modulated according to the ambient vibrations. This in turn modulates the intensity of the light at detector 18. When the intensity increases due to ambient vibrations, the detector voltage increases and the signal sent to the piezoelectric transducer (PZT) tube shifts the phase towards reducing the intensity of the light at detector 18. The reduced intensity reduces the detector voltage and the PZT voltage, and produces a further drop in the intensity of the light. Conversely, when the intensity of the light decreases due to ambient vibrations, the signal sent to the PZT shifts the phase towards increasing the intensity of the light at detector 18. Thus the circuit operates as an automatic feedback loop, which essentially eliminates the ambient component of the detector signal. Once the optical paths are stabilized, the signal received by detector 18, as shown by the trace on oscilloscope 32, is flat until an ultrasonic transient occurs. The oscilloscope trace follows the surface displacement in relative amplitude and frequency, up to the bandpass of the oscilloscope. Since the frequencies of the ultrasonic transients are well above the pass-band of the low-pass filter, the ultrasonic transients do not propagate through the phase stabilization circuit.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A dual optical interferometer apparatus for simultaneously measuring the in-plane and out-of-plane displacements of the surface of a material comprising:
   (a) a first interferometer system comprising means for directing a first beam derived from a laser source at the surface of the material,
   means for collecting the reflection of the first beam off the material surface and directing the reflected first beam onto a phase conjugate mirror,
   means for directing a second beam derived from said laser source at the phase conjugate mirror,
   a mirror creating a third beam directed at the phase conjugate mirror by reflecting the second beam back into the phase conjugate mirror at exactly the opposite direction to the second beam whereby said phase conjugate mirror generates a fourth beam that exactly counterpropagates with respect to the first beam, and means for collecting the scattered radiation from the surface of the material and focussing the scattered radiation onto a first detector;

(b) a second interferometer system comprising means for generating a reference beam by deriving a beam from the laser source before that beam strikes the surface of the material and directing the reference beam at a second optical detector, means for collecting the fourth beam after it is reflected by the surface of the material and as it is counter-propagating with respect to the first beam and directing that fourth beam at the second detector; and (c) means for analyzing the electrical signals produced by the first and second detectors to obtain the in-plane and out-of-plane vibrations of the surface of a material.

2. The dual optical interferometer apparatus of claim 1, wherein the means for collecting the reflection of the first beam, collecting the scattered radiation from the surface of the material, and collecting the fourth beam after it is reflected by the surface of the material are lenses.

3. The optical interferometer apparatus of claim 1, wherein the means for directing the first, second, fourth and reference beams are optical fibers.

4. The dual optical interferometer apparatus of claim 1, wherein the phase conjugate mirror is a single crystal of photorefractive material.

5. The optical interferometer apparatus of claim 4, wherein the photorefractive material is barium titanate.

6. The optical interferometer apparatus of claim 4, wherein the photorefractive material is selected from the group consisting of barium titanate, strontium barium niobate, $Bi_{12}SiO_{20}$, $LiNbO_3$, $LiTaO_3$ and $KTa_{1-x}Nb_xO_3$.

7. The Optical interferometer apparatus of claim 1, further comprising an electromechanical path stabilization system.

8. The optical interferometer apparatus of claim 7, wherein the electromechanical path stabilization system comprises an optical fiber wound around a piezoelectric tube having conductors lining its inside and outside surfaces.

9. The optical interferometer apparatus of claim 7, further comprising a third detector monitoring the absolute light level of said laser source, wherein the signal from said third detector is used to compensate for the effect of fluctuations in the absolute light level of the laser source in the electromechanical path stabilization system.

10. The optical interferometer apparatus of claim 1, wherein the second beam is directed at the phase conjugate mirror at an angle, relative to the first beam and to the optic axis of the crystal, selected to maximize the efficiency of the phase conjugate mirror.

11. The optical interferometer apparatus of claim 1, wherein the laser source is a HeNe laser.

12. The optical interferometer apparatus of claim 1, wherein the laser source is selected from the group consisting of an argon-ion laser, a krypton-ion laser, a He-Cd laser, a CW YAG laser, a diode laser and a CW diode-pumped YAG laser.

13. A dual optical interferometer apparatus for simultaneously measuring the in-plane and out-of-plane displacements of the surface of a material comprising:

(a) a single laser source producing a beam of coherent radiation optically coupled to a first end of a first optical fiber;

(b) a first 1×2 optical beam divider coupled to a second end of the first optical fiber and dividing the beam into two portions, one portion being optically coupled to a first end of a second optical fiber and the other portion being optically coupled to a first end of a third optical fiber;

(c) a 2×2 optical beam divider/coupler having a first input optically coupled to a second end of the second optical fiber, and a first output optically coupled to a first end of a fourth optical fiber;

(d) a first lens optically coupled to a second end of the fourth optical fiber, focussing the beam emerging from the second end of the fourth optical fiber on a sample position;

(e) a second lens directed at the sample position positioned to collect radiation reflected at the sample position and to direct that radiation at a first side of the phase conjugate mirror along a first direction with respect to the phase conjugate mirror, that radiation constituting the first beam entering the phase conjugate mirror;

(f) a second 1×2 optical beam divider optically coupled to a second end of the third optical fiber, dividing the beam from the third optical fiber into two portions, one portion being coupled to a fifth optical fiber and the other portion being coupled into a sixth optical fiber, wherein the sixth optical fiber is optically coupled to a second input of the 2×2 optical beam divider/coupler;

(g) a third lens optically coupled to a second end of the fifth optical fiber directing the beam emerging from the second end of the fifth optical fiber at a second side of the phase conjugate mirror along a second direction with respect to the phase conjugate mirror, that beam being the second beam entering the phase conjugate mirror;

(h) a mirror positioned next to a third side of the phase conjugate mirror, said third side being the side opposite to the second side of the phase conjugate mirror, said mirror being oriented to reflect the beam from the second end of the fifth optical fiber and transmitted across the phase conjugate mirror exactly opposite to that beam, that beam being the third beam entering the phase conjugate mirror, whereby the phase conjugate mirror generates a fourth beam which is a counterpropagating replica of the first beam entering the phase conjugate mirror;

(i) a fourth lens positioned to image radiation scattered at the sample position onto a first optical detector; and (j) a second optical detector coupled to a second output of the 2×2 optical beam divider/coupler, receiving both a reference beam derived from the laser source and a beam derived from the fourth beam generated by the phase conjugate mirror after the fourth beam is reflected by the surface of the material;

whereby the first optical detector is sensitive to in-plane vibrations at the surface of samples placed in the sample position, and the second detector is sensitive to out-of-plane vibrations at the surface of samples placed in the sample position, and wherein electric signals produced by the first and second optical detector are analyzed to simultaneously obtain both the in-plane and out-of-plane vibrations of samples placed in the sample position.

14. The dual optical interferometer apparatus of claim 13, wherein the phase conjugate mirror is a single crystal of photorefractive material.

15. The dual optical interferometer apparatus of claim 14, wherein the photorefractive material is barium titanate.

16. The dual optical interferometer apparatus of claim 14, wherein the photorefractive material is selected from the group consisting of barium titanate, strontium barium niobate, $Bi_{12}SiO_{20}$, $LiNbO_3$, $LiTaO_3$ and $KTa_{1-x}Nb_xO_3$.

17. The dual optical interferometer apparatus of claim 13, further comprising an electromechanical path stabilization system.

18. The dual optical interferometer apparatus of claim 17, wherein the electromechanical path stabilization system comprises an optical fiber wound around a piezoelectric tube having conductors lining its inside and outside surfaces.

19. The optical interferometer apparatus of claim 17, further comprising a third detector monitoring the absolute light level of said laser source, wherein the signal from said third detector is used to compensate for the effect of fluctuations in the absolute light level of the laser source in the electromechanical path stabilization system.

20. The dual optical interferometer apparatus of claim 13, wherein the second direction with respect to the phase conjugate mirror is selected, relative to the first beam and to the optic axis of the crystal, to maximize the efficiency of the phase conjugate mirror.

21. The dual optical interferometer apparatus of claim 13, wherein the laser source is a HeNe laser.

22. The dual optical interferometer apparatus of claim 13, wherein the laser source is selected from the group consisting of an argon-ion laser, a krypton-ion laser, a He-Cd laser, a CW YAG laser, a diode laser and a CW diode-pumped YAG laser.

23. A method for simultaneously measuring the in-plane and out-of-plane displacements of the surface of materials comprising:
(a) directing a first beam derived from a laser source at the surface of a material;
(b) collecting the reflection of the first beam off the surface of the material and directing that reflected first beam onto a phase conjugate mirror along a first direction with respect to the phase conjugate mirror;
(c) directing a second beam derived from the laser source at the phase conjugate mirror along a second direction with respect to the phase conjugate mirror;
(d) creating a third beam by reflecting the second beam after it has passed through the phase conjugate mirror back into the phase conjugate mirror at exactly the opposite direction to the second beam, whereby the phase conjugate mirror generates a fourth beam that exactly counterpropagates with respect to the first beam;
(e) collecting the scattered radiation from the surface of the material;
(f) focussing the scattered radiation onto a first detector;
(g) deriving a reference beam from the laser source before that radiation strikes the surface of the material and directing that radiation at a second optical detector;
(h) collecting the fourth beam after it is reflected by the surface of the material and as it is counter-propagating with respect to the first beam and directing that fourth beam at the second detector; and
(i) analyzing the electrical signals produced by the first and second detectors to obtain the in-plane and out-of-plane vibrations of the surface of a material.

24. The method of claim 23, wherein lenses are used to collect the reflection of the first beam, the scattered radiation from the surface of the material, and the fourth beam after it is reflected by the surface of the material.

25. The method of claim 23, wherein optical fibers are used to direct the first, second and fourth beams.

26. The method of claim 23, wherein the phase conjugate mirror is a single crystal of photorefractive material.

27. The method of claim 26, wherein the photorefractive material is barium titanate.

28. The method of claim 26, wherein the photorefractive material is selected from the group consisting of barium titanate, strontium barium niobate, $Bi_{12}SiO_{20}$, $LiNbO_3$, $LiTaO_3$ and $KTa_{1-x}Nb_xO_3$.

29. The method of claim 23, further comprising the step of stabilizing the relative optical path lengths of the beams striking the first and second detectors.

30. The method of claim 29, wherein the relative optical paths are stabilized in ah electromechanical path stabilization system comprising an optical fiber wound around a piezoelectric tube having conductors lining its inside and outside surfaces.

31. The method of claim 30, wherein the absolute light level of said laser source is monitored by a third detector, the signal from said third detector being used in the electromechanical path stabilization system to compensate for the effect of fluctuations in the absolute light level of the laser source.

32. The method of claim 23, wherein the second beam is directed at the phase conjugate mirror at an angle selected to maximize the efficiency of the phase conjugate mirror.

33. The method of claim 23, wherein the laser source is a HeNe laser.

34. The method of claim 23, wherein the laser source is selected from the group consisting of an argon-ion lasers, a krypton-ion laser, a He-Cd laser, and a diode laser.

35. A dual interferometer system comprising:
(a) a laser source;
(b) a first interferometer comprising a first interfering beam derived from the laser source and a second interfering beam, the second interfering beam being a counter-propagating replica of the first beam generated by a phase conjugate mirror from three beams: (i) the first interfering beam, (ii) a first incident beam derived from the laser source incident upon the phase conjugate mirror at a first angle to the first interfering beam and (iii) a second incident beam derived from the laser source incident upon the phase conjugate mirror at a second angle to the first interfering beam;
(c) a second interferometer comprising the second interfering beam generated by the phase conjugate mirror and a third interfering beam derived from the laser source; and (d) an optical path stabilization system positioned in the optical path between the laser source and the first incident beam, wherein the optical path stabilization system simultaneously stabilizes the optical paths of both interferometers with respect to ambient vibrations.

36. The dual interferometer system of claim 35, wherein the first and second interferometers comprise optical fibers.

37. The dual interferometer system of claim 35, wherein the phase conjugate mirror is a single crystal of photo refractive material.

38. The dual interferometer system of claim 35, wherein the optical path stabilization system comprises an optical fiber wound around a piezoelectric tube having conductors lining its inside and outside surfaces.

39. The dual interferometer system of claim 35, further comprising means for detecting the absolute light level of the laser source, and means for compensating for the effect of fluctuations in the light level of the laser source in the optical path stabilization system.

* * * * *